United States Patent [19]
Hofmann

[11] Patent Number: 5,386,090
[45] Date of Patent: Jan. 31, 1995

[54] ELECTRIC SWITCH UNIT FOR THE CONTROL OF AIR CONDITIONING UNITS IN AUTOMOTIVE VEHICLES

[75] Inventor: Georg Hofmann, Heilbronn-Horkheim, Germany

[73] Assignee: SWF Auto-Electric GmbH, Germany

[21] Appl. No.: 105,080

[22] Filed: Aug. 11, 1993

[30] Foreign Application Priority Data

Aug. 20, 1992 [DE] Germany ............... 4227468

[51] Int. Cl.$^6$ ............................................. H01H 9/00
[52] U.S. Cl. ........................................ 200/308; 200/310; 200/311
[58] Field of Search ............... 200/308, 310, 311, 312, 200/313, 314, 315, 316, DIG. 47; 362/32, 31, 26, 802

[56] References Cited

U.S. PATENT DOCUMENTS

| | | | |
|---|---|---|---|
| 4,163,883 | 8/1979 | Boulanger | 200/314 |
| 4,489,227 | 12/1984 | Lamarche | 200/314 |
| 4,670,633 | 6/1987 | Kaiwa et al. | 200/313 X |
| 4,868,384 | 9/1989 | Franken et al. | 200/314 X |
| 4,947,011 | 8/1990 | Muranoi et al. | 200/310 X |
| 5,050,946 | 9/1991 | Hathaway et al. | 362/31 X |
| 5,063,479 | 11/1991 | Satoh | 200/315 X |
| 5,128,842 | 7/1992 | Kermochi | 200/DIG. 47 |
| 5,188,220 | 2/1993 | Schmitt-Walter | 200/313 |
| 5,227,773 | 7/1993 | Wu et al. | 361/31 X |

FOREIGN PATENT DOCUMENTS

| | | | |
|---|---|---|---|
| 2825833 | 8/1980 | Germany . | |
| 3827090 | 2/1990 | Germany . | |
| 106827 | 4/1990 | Japan | 200/313 |
| 2201038 | 8/1988 | United Kingdom | 200/310 |

*Primary Examiner*—Henry J. Recla
*Assistant Examiner*—David J. Walczak
*Attorney, Agent, or Firm*—Robert P. Seitter; J. Gordon Lewis

[57] ABSTRACT

An electric switch unit, in particular for the control of air conditioning units in automotive vehicles. The switch unit includes pushbuttons whose symbols are illuminated by light which is guided from a central source of light through a light-guiding member. The light-guiding member is composed of interconnected light-guiding bars to which projections are molded. From the projections the light exits toward the pushbuttons. The front faces of the projections are concavely curved, and as a result a uniform illumination of the symbol areas is provided. The light-guiding bars are furnished with totally reflecting surfaces, and as a result the total quantity of light incident upon them is reflected into the projections. The quantities of light exiting from each projection are equal. Due to the arrangement of a focusing lens at the transition of the light from the source of light to the light-guiding bars, a parallel beam of light is emitted into the latter.

10 Claims, 2 Drawing Sheets

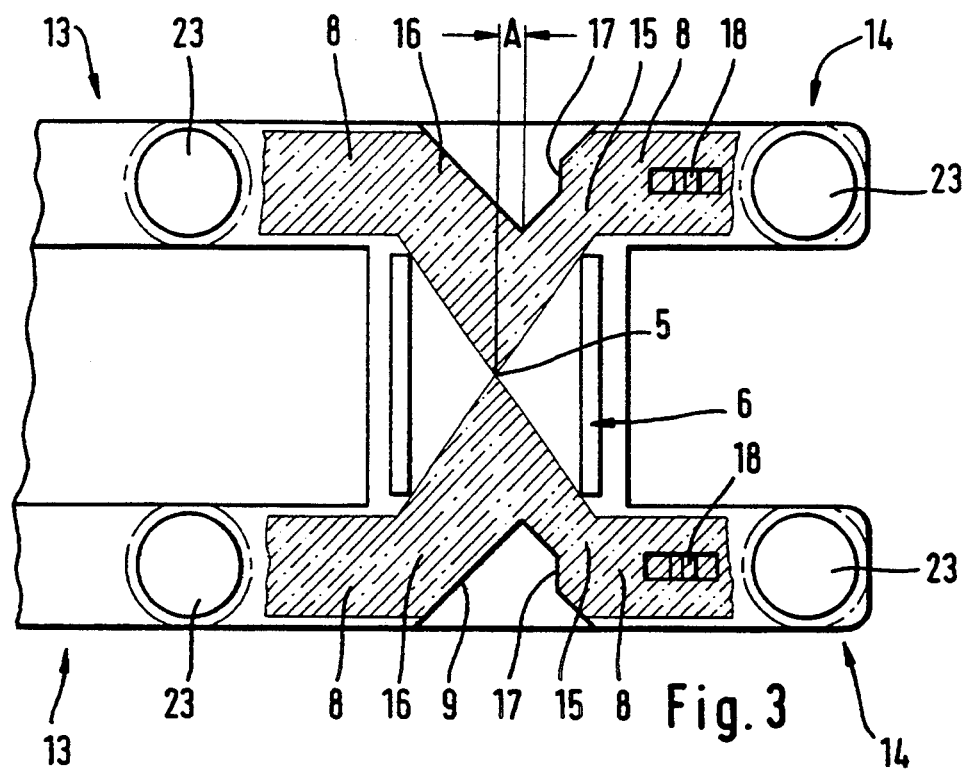
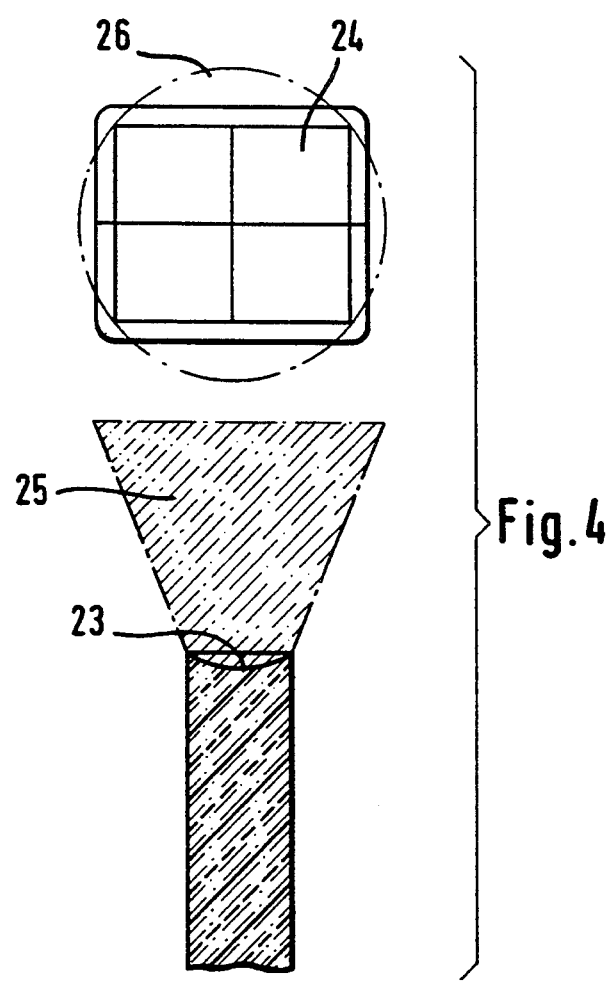

ELECTRIC SWITCH UNIT FOR THE CONTROL OF AIR CONDITIONING UNITS IN AUTOMOTIVE VEHICLES

BACKGROUND OF THE INVENTION

1. Field of Invention

This invention is generally related to an electric switch unit. More specifically, this invention is related to an electric switch unit for controlling air conditioning units in automotive vehicles.

2. Description of the Prior Art

A switch unit of this kind is known from the German patent application published without examination (1st publication), No. DE 38 27 090 A1. The described switch unit is comprised of a plurality of control elements to which the light is directed from a central source of light through a light-guiding member. In order to make sure that the light illuminates the symbol area of the control elements, pushbuttons for example, the light-guiding member is furnished with light-guiding bars and with projections which are associated with the individual control elements and through whose front faces the light exits and illuminates the indicating bezels of the individual pushbuttons. In order to prevent stray light from leaving from the light-guiding member and invading the spaces in between the individual control elements, an intermediate plate is provided which covers the relevant ranges of the light-guiding member. The light which leaves the front faces of said projections forms a so-called search illumination of the electric switch unit. The symbols in the indicating bezels of the control elements are to be recognized by an operator, so that the specific function of the electric switch unit is selected, for example by actuating the pushbutton. It is important that the indicating bezels/symbol areas of the control elements are illuminated in a uniform manner. In the described switch unit the light-guiding member is configured such that a hollow cylinder for the accommodation of a central source of light is formed between two light-guiding bars. Starting from this light source the light is guided through the light-guiding bars and through the projections molded to them to the control elements. The receptacle of the central light source is shaped as a hollow cylinder. Therefore, stray fields come about at the surfaces of light entry into the light-guiding bars, as a result whereof part of the quantity of light originating from the source of light is not at all emitted into anyone of the light-guiding bars. Beyond this, the stray fields coming about will lead to the creation of parasitic light which must be cancelled by countermeasures; for example by covering the light-guiding member using an intermediate plate, as described above.

Another light-guiding element is known from the German patent application published without examination (1st publication), No. 31 23 369 A1, which presents at its one side a plurality of reflecting surfaces at which the entering light rays are deviated in such a way that rays of identical intensity leave at the light exit surface. The reflecting surface is arched and consists of a plurality of individual deviating surfaces.

From the printed and examined patent application DE AS 28 25 833 a switch pushbutton is known for uniform illumination of the indicating area independently of the position of the illuminating light emitting diode. A body of transparent material is provided which has the shape of a truncated pyramid and whose convexly arched surface faces the light emitting diode. The pyramid body constitutes a self-contained component part which is inserted into the key button. Where indicating areas of a plurality of key buttons are to be illuminated, then such a pyramid body will be required for each single key button.

From the German patent application published without examination (1st publication), No. DE 32 37 589 A1, another illuminated key button is known in which the recognizability of the symbols positioned at the button is improved in that the light of a comparatively weak light source is directed on a partial range of the key surface only. For this purpose a frosted glass plate contained in the key surface is illuminated with a converging light beam with the aid of a focusing lens. It is of essential importance that the light is directed onto the frosted glass plate as a focused beam. To this end, the focal length of the focusing lens is sized such that a converging beam of light is produced. Similarly as in the above-described design it will be necessary also in this instance that each button is furnished with such an arrangement.

SUMMARY OF THE INVENTION

This invention has the object to provide an electric switch unit of the kind under review that provides a design which is simple to manufacture and which offers advantages in use to provide uniform illumination of individual indicating bezels while simultaneously avoiding parasitic light.

Due to the projections, included in one embodiment of this invention, that are molded to the light-guiding bars being configured such that their front faces are concavely curved, the light leaving said front faces is diffused. Said concavely curved surface has the effect of a diffusing lens. The radius of the diffusing lens can be selected depending on the diameter of the projection and on the size of the area to be illuminated. The uniform illumination of the symbol area increases the ease of manipulation of such a switch unit. Beyond the uniform illumination of the indicating bezel, the arrangement of the concave lens at the front face of the projection provides the additional advantage that in the condition of the control element being pressed down in which the area to be illuminated comes to be positioned nearer to the projection the light intensity will be higher in the centre of the indicating bezel than in its marginal ranges. This results in an additional indicator illumination beyond the functional indication which is effected by a small lamp in the push-button switch. It is further attained that symbols which are positioned off—center in the indicating bezel can be illuminated in a uniform way. For this purpose the main axis of the diffusing lens is slanted relative to the center line of the cylindrical projection. This results in the creation of a laterally shifted stray field of the exiting light which illuminates the symbol in a uniform way.

One embodiment of this invention includes a light-guiding member that is composed of two light-guiding bars which are interconnected by a web. The central light source is disposed between said light-guiding bars. The light-entry surfaces at which the light originating from the source of light enters the light-guiding bars have the shape of focusing lenses. The radius of the focusing lens can be adapted to the size of the light-entry surface. The configuration of the light-entry surfaces in the shape of focusing lenses has the effect that the light rays originating from the source of light are emitted into the light-guiding member and into the light-guiding bars, respectively, as a parallel beam. When the light travels in the shape of a parallel beam in the longitudinal direction of the light-guiding element, then it will not exit from the bounding surfaces of the light-guiding bars, as a result whereof the parasitic light effect is prevented. In a design of this type of the light-guiding member further accessory elements are unnecessary, which otherwise would have to shield off the light exiting at the surface of the light-guiding member. With the convex lenses deviating surfaces are associated at which the light rays exiting from the lenses are deviated such that the total quantity of light is emitted into the light-guiding bars and that no light exits from the bounding surfaces of the light-guiding member which are positioned within the range of the light source.

In one advantageous embodiment of this invention the amount of lateral offsetting of the position of the light-deviating surfaces relative to the center line of the lens determines the quantity of light emitted into the lateral sections of the light-guiding bars. When a section of the light-guiding bar is longer and when indicating bezels are disposed farther away from the source of light and have to be illuminated, then the emission of a higher quantity of light will be required than into a section of the light-guiding bar in which, for example, only an indicating bezel of a control element is to be illuminated which is arranged in the immediate vicinity of the source of light.

In the range of the projections, at the bounding surface of the light-guiding bar facing away from them totally reflecting surfaces are provided at which the incident light is being reflected in such a way that into each projection this whole quantity of light is emitted. Due to the size, inclination and shape of the reflecting surfaces due to the configuration of the light-guiding bar such that its cross-section is tapered stepwise within the range of the projections it is achieved that into each projection an equal quantity of light is emittable. If, for instance, three projections are provided, then by each reflecting surface one third of the total quantity of light emitted into the light-guiding bar is being reflected into each projection. The reflecting surface which is juxtaposed to the light source has a circular configuration. The purpose achieved by this is that the stray light emitted by the source of light will reach this surface and will be reflected into the projection. The reflecting surface being juxtaposed to the first reflecting surface is configurated such that it presents two sections merging into each other and extending at angles of 48 and 53 degrees. The reflecting surface that is associated with the third projection, as viewed in the longitudinal direction of the light-guiding bar, extends between the two bounding surfaces of the light-guiding bar at an angle of 45 degrees.

It will be of advantage when the projections are configured as circular cylinders. In this configuration it is particularly easy to apply a concavely curved surface as a front face.

As already described above, in addition to the search illumination the control elements are furnished with a functional illumination. Light emitting diodes serve as a source of light for the functional illumination. The light emitting diodes are directly neighboring the projections of the light-guiding bar. It will be advantageous when the connections of the light emitting diodes are disposed in the light-guiding bars, as a result whereof a separate light-emitting-diode holder becomes unnecessary and the light-guiding member will perform this function.

Still another embodiment includes one deviating surface which emits the light beam which comes from the source of light into the light-guiding bar that has a vertical section in this range in which the light-emitting-diode connection is arranged. It is achieved in this way that the reflections occurring at the light-emitting-diode connection are being shielded off.

The light-guiding member is comprised of two light-guiding bars which are interconnected by a web. It will be advantageous when the web simultaneously forms a slide rail for the locking elements of the control elements. In this way an additional component of the electrical unit is rendered unnecessary.

The invention will be described in more detail making reference to the undermentioned drawings.

BRIEF DESCRIPTIONS OF THE DRAWINGS

FIG. 3 is an illustration of the course of the light rays in the range of the central light source.

FIG. 4 is an illustration of a projection and of the beam of light exiting from the former's front face.

DETAILED DESCRIPTION OF THE PREFERRED EMBODIMENTS

Figure 1:
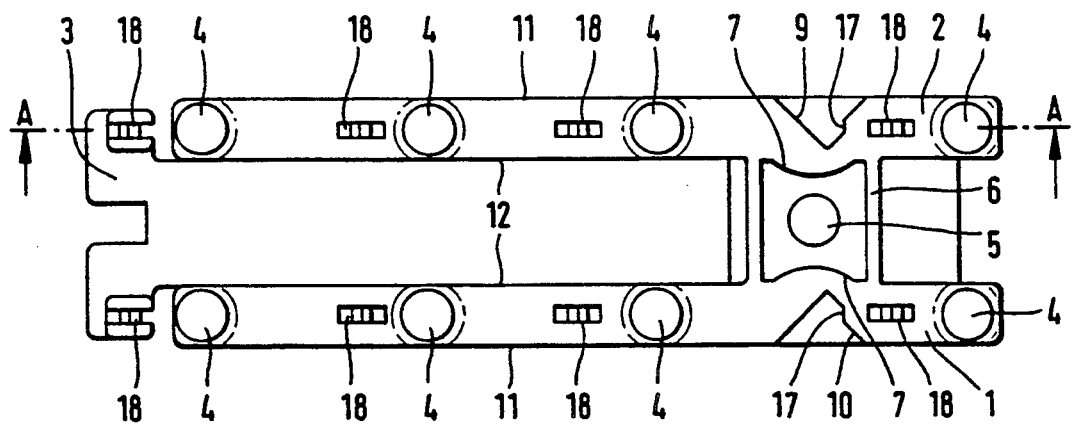
FIG. 1 shows the top view of a light-guiding member.

FIGS. 1 and 3 show the light-guiding member which consists of a transparent material and comprises two light-guiding bars 1, 2 which are interconnected by a web 3. Projections 4 are molded to web 3 extending vertically into the range of control elements of the electrical unit which are not illustrated in the drawing. In the embodiment shown in FIG. 1 the light-guiding bars 1, 2 are each provided with four projections 4 for the illumination of associated pushbuttons. The light which is to be emitted into the light-guiding member comes from a central light source 5 which can be a sheathed incandescent bulb. The web is formed with an opening in order to create a receptacle for the central light source 5. The opening is defined by two vertical connecting webs 6 which extend transversely to the web 3 and which preferably are covered by opaque material in order to avoid losses of light intensity. The surfaces of light entry 7 along which the light from the central light source 5 enters the light-guiding bars 1, 2 are shaped convexly and, as a consequence, have the effect of focusing lenses. As a result, a parallel beam of light 8 (see FIG. 3) is emitted into the light-guiding bars 1, 2, respectively. In order to avoid losses of light intensity, deviating surfaces 9, 10 are associated with the lens-shaped surfaces 7 such that the beam of light is deviated in such a manner that it enters the light-guiding bars 1, 2 in a parallel direction. The purpose achieved by a parallel course of the light rays 8 within the light-guiding bars 1, 2 is that no parasitic light exits at the bounding surfaces 11, 12 of the light-guiding bars 1, 2. The lateral offsetting of the position of the light-deviating surfaces 9, 10 relative to the center line of the lens allows preselecting the quantity of light 15 (see FIG. 3), 16 which enters the sections 13, 14 of the light-guiding bars 1, 2 extending sideways of the source of light 5. Aside the projections 4, bags (or recesses) 18 are disposed for accepting light-emitting-diodes (not shown). The deviating surface 10 comprises a straight section 17 in order to intercept reflections which originate in the section 14 at the bag 18 of the light-guiding bar 1.

Figure 2:
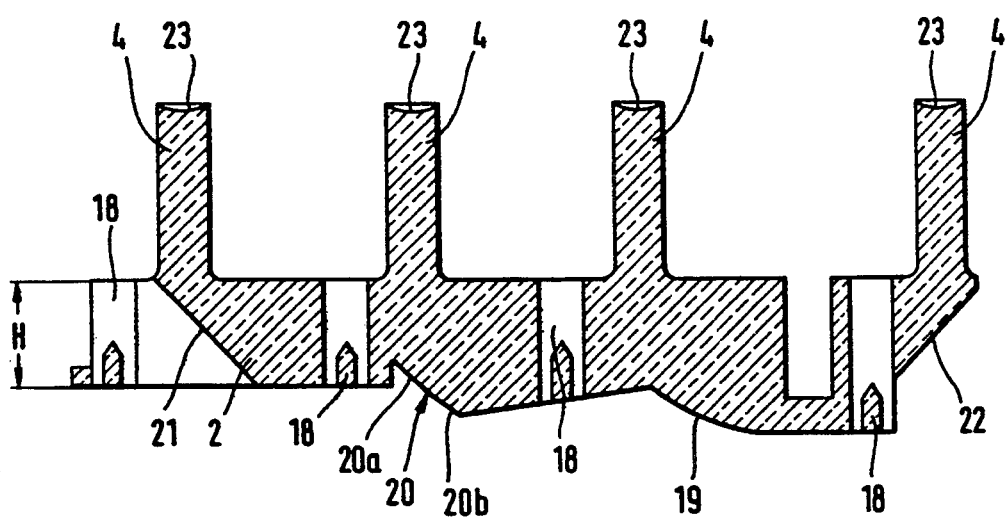
FIG. 2 shows a cross section through the light-guiding member in FIG. 1 along the line A—A.

As shown best in FIG. 2, the light-guiding bars 1, 2 are furnished with reflecting surfaces 19, 20, 21, 22. At these surfaces the total reflection of the incident light rays takes place in such a way that the reflected rays are guided into the projections 4. The aim achieved by the arrangement of the reflecting surfaces 19, 20, 21, 22 is that no stray radiation exits from the light-guiding member. With an identical source of light the intensity of the illumination of the control elements (not shown) will, thus, be higher. A source of light can be utilized which has a lower light intensity in order to obtain the identical illumination of the indicating bezels. The projections 4 jut out into the control elements (not shown) which are configurated as pushbuttons in most of the cases. From the front faces 23 of the projections 4 light exits and illuminates the indicating bezels of the push-buttons. Said front faces 23 of said projections 4 have a concave shape and offer the effect of diffusing lenses.

FIG. 4 illustrates how a rectangular indicating-bezel area 24 can be illuminated by a beam of light 25 exiting from the front face 23 of the projection 4. In the presence of minimum losses which are due to the cylindrical configuration of the projection 4 (beam of light 26) the rectangular area 24 of the indicating bezel is completely and uniformly illuminated. By slanting the axis of the concave front face 23 of the projection 4, symbols that are off-center in the indicating bezel 24 can also be fully and uniformly illuminated.

The reflecting surface 19 has a circular configuration. The purpose achieved with this configuration is that a stray light which originates from the source of light 5 will at said reflecting surface 19 totally be reflected into the projection 4. The reflecting surface 20 which neighbors the reflecting surface 19 consists of two straight sections merging into each other and having inclinations of 48 and 53 degrees. The reflecting surface 21 which is associated with the third projection 4 is disposed at an angle of 45 degrees and extends over the whole cross section H of the light-guiding bar 1 or 2. The light-guiding bar has its largest cross section in the range of the source of light 5. It is tapered stepwise in the direction of light propagation as the distance from the source of light 5 increases, the steps being positioned in the range of the projections 4. The quantity of light entering the section 13 of the light-guiding bar 1, 2 is divided such that each one of the individual projections 4 is reached by one third of the total emitted quantity of light. This is achieved by this configuration of the cross section of the light-guiding bar 1, 2 and by the shape, size and inclination of the reflecting surfaces 19, 20, 21, 22. It is attained in this way that from each front face 23 an equal quantity of light exits, which means that any indicating bezel, also including those which are disposed more distant from the source of light 5, will be illuminated with an equal light intensity. In the section 14 of the light-guiding bars 1, 2 only one projection 4 is provided. By the lateral off-setting of the reflecting surface 10 it is achieved that into said section 14 only part of the total quantity of light is emitted. This will then be totally reflected into the projection 4 at the reflecting surface 22.

The web 3 connecting the two light-guiding bars 1, 2 may also serve as a rail for the slide of the locking elements (not shown) that are part of applicable control elements.

The foregoing description is exemplary rather than limiting in nature. This invention is limited only by the appended claims.

What is claimed is:

1. An electric switch unit of the type including indicating bezels furnished with symbols, comprising:

a transparent light guiding member adapted to guide light emanating from a central source of light to said indicating bezels, said light guiding member including at least one light-guiding bar having projections molded to said bar adjacent said indicating bezels, said projections having a front face disposed such that the light exits toward said indicating bezels and thereby illuminates the indicating bezels wherein said front faces of said projections being concavely curved;

wherein said light-guiding member further includes surfaces having the shape of focusing lenses;

wherein said light-guiding member further includes deviating surfaces for guiding the light into said at least one light-guiding bar; and wherein said light-guiding member further includes totally reflecting surfaces in said light-guiding bars proximate said projections, said totally reflecting surfaces having a preselected size, inclination and shape such that into each of said projections an equal quantity of light is emittable, wherein the cross section of said light-guiding bars is tapered stepwise in the direction of light propagation said stepwise tapers proximate said projections, wherein a first said totally reflecting surface is positioned in said light-guiding bar and adjacent said source of light and has a circular configuration.

2. An electric switch unit as claimed in claim 1, wherein said light deviating surfaces are laterally offset relative to a center of said source of light, and laterally offset relative to a center of said focusing lens.

3. An electric switch unit as claimed in claim 1, wherein said projections have the shape of circular cylinders.

4. An electric switch unit as claimed in claim 3, wherein a second said totally reflecting surface is adjacent said first totally reflecting surface as viewed in the direction of light propagation, has an inclined course and is composed of two straight sections which merge into each other and are slanted at angles of 48 and 53 degrees, respectively.

5. An electric switch unit as claimed in claim 1, wherein at least one said totally reflecting surface that is associated with one of said projections extends over the total cross section of said light-guiding bar at an angle of 45 degrees.

6. An electric switch unit as claimed in claim 1, wherein said light-guiding bars are furnished with bags which are adapted to be engaged by light-emitting-diode.

7. An electric switch unit as claimed in claim 6, wherein one said light deviating surface comprises a vertical section proximate said light-emitting-diode bag.

8. An electric switch unit as claimed in claim 1, wherein said light-guiding member is comprised of two of said light-guiding bars which are interconnected by a web.

9. An electric switch unit of the type including indicating bezels furnished with symbols, comprising:

a transparent light guiding member adapted to guide light emanating from a central source of light to said indicating bezels, said light guiding member including at least one light guiding bar having projections molded to said bar adjacent said indicating bezels, said projections having a front face disposed such that the light exits toward said indicating bezels and thereby illuminates the indicating bezels;

wherein said front faces of said projections being concavely curved;

wherein said light-guiding member further includes surfaces having the shape of focusing lenses;

wherein said light-guiding member further includes deviating surfaces for guiding the light into said at least one light-guiding bar; and wherein said light-guiding member further includes totally reflecting surfaces in said light-guiding bars proximate said projections, said totally reflecting surfaces having a preselected size, inclination and shape such that into each of said projections an equal quantity of light is emittable, wherein the cross-section of said light-guiding bars is tapered stepwise in the direction of light propagation said stepwise tapers proximate said projections, wherein said light-guiding bars are furnished with bags which are adapted to be engaged by light-emitting-diodes.

10. An electric switch unit of the type including indicating bezels furnished with symbols, comprising:

a transparent light guiding member adapted to guide light emanating from a central source of light to said indicating bezels, said light guiding member including at least one light-guiding bar having projections molded to said bar adjacent said indicating bezels, said projections having a front face disposed such that the light exits toward said indicating bezels and thereby illuminates the indicating bezels;

wherein said front faces of said projections being concavely curved;

wherein said light-guiding member further includes surfaces having the shape of focusing lenses;

wherein said light-guiding member further includes deviating surfaces for guiding the light into said at least one light-guiding bar; and wherein said light guiding member further includes totally reflecting surfaces in said light guiding bars proximate said projections, said totally reflecting surfaces having a preselected size, inclination and shape such that into each of said projections an equal quantity of light is emittable, wherein the cross-section of said light-guiding bars is tapered stepwise in the direction of light propagation said stepwise tapers proximate said projections, wherein said light-guiding bars are furnished with bags which are adapted to be engaged by light emitting diodes, wherein one of said light deviating surfaces comprises a vertical section proximate said light-emitting-diode bag.

* * * * *